United States Patent [19]
McBain

[11] Patent Number: 6,007,011
[45] Date of Patent: Dec. 28, 1999

[54] FOOD PROCESSING APPARATUS

[75] Inventor: Theodore McBain, PO Box 775, Tahoe City, Calif. 96145

[73] Assignee: Theodore McBain, Tahoe City, Calif.

[21] Appl. No.: 09/192,911

[22] Filed: Nov. 16, 1998

[51] Int. Cl.[6] .................................................. A47J 43/046
[52] U.S. Cl. ........................................................ 241/282.1
[58] Field of Search ............................. 241/282.1, 282.2, 241/292.1, DIG. 17, 199.12; 99/510

[56] References Cited

FOREIGN PATENT DOCUMENTS 2238466   6/1991   United Kingdom ................ 241/282.1

Primary Examiner—Mark Rosenbaum
Attorney, Agent, or Firm—Sierra Patent Group, Ltd.

[57] ABSTRACT

A food processing system is described, comprising a processing chamber having a material intake and a shaft aperture, a motor assembly having a shaft, the shaft rotating along a vertical axis when the motor turns, the shaft passing through said shaft aperture into said processing chamber, an accessory coupler positioned within the processing chamber and coupled with the shaft, the accessory coupler having a first aperture and a second aperture, the first aperture being positioned so that material introduced into the processing chamber passes into the accessory coupler, and out through the second aperture, a blade assembly slidably connected to the accessory coupler so that the blade assembly may be vertically positioned in at least two distinct vertical locations along the axis of rotation of the shaft, the blade assembly further comprising an aperture through which material passes from the accessory coupler, through the blade assembly, into the processing chamber, as the shaft is rotated by said motor assembly.

13 Claims, 4 Drawing Sheets

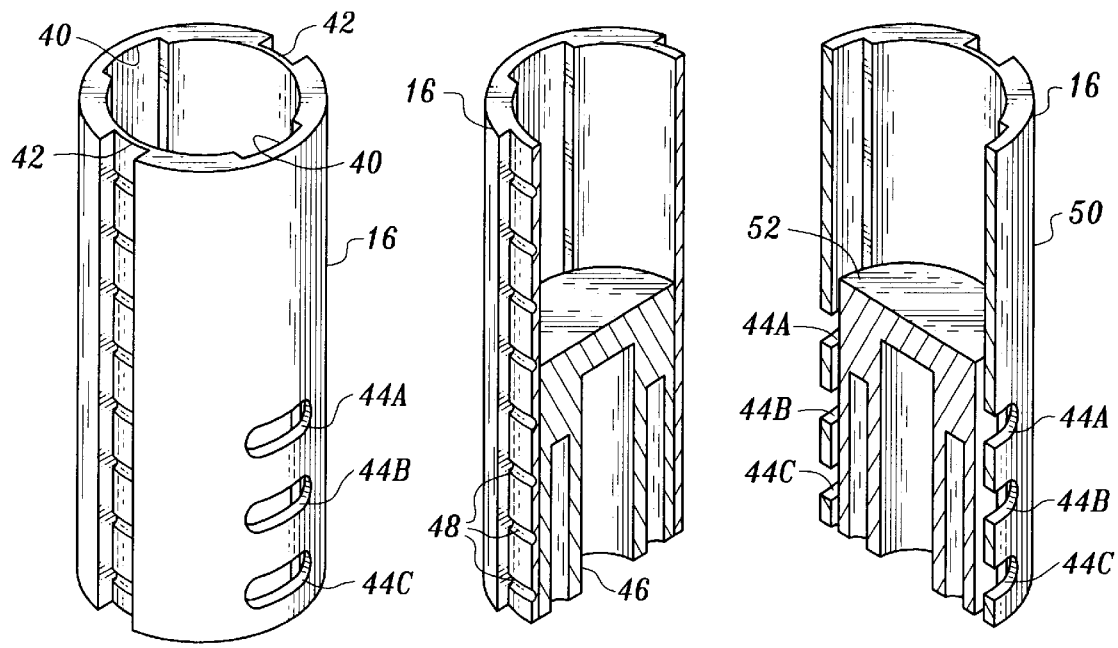
Fig. 2A  Fig. 2B  Fig. 2C
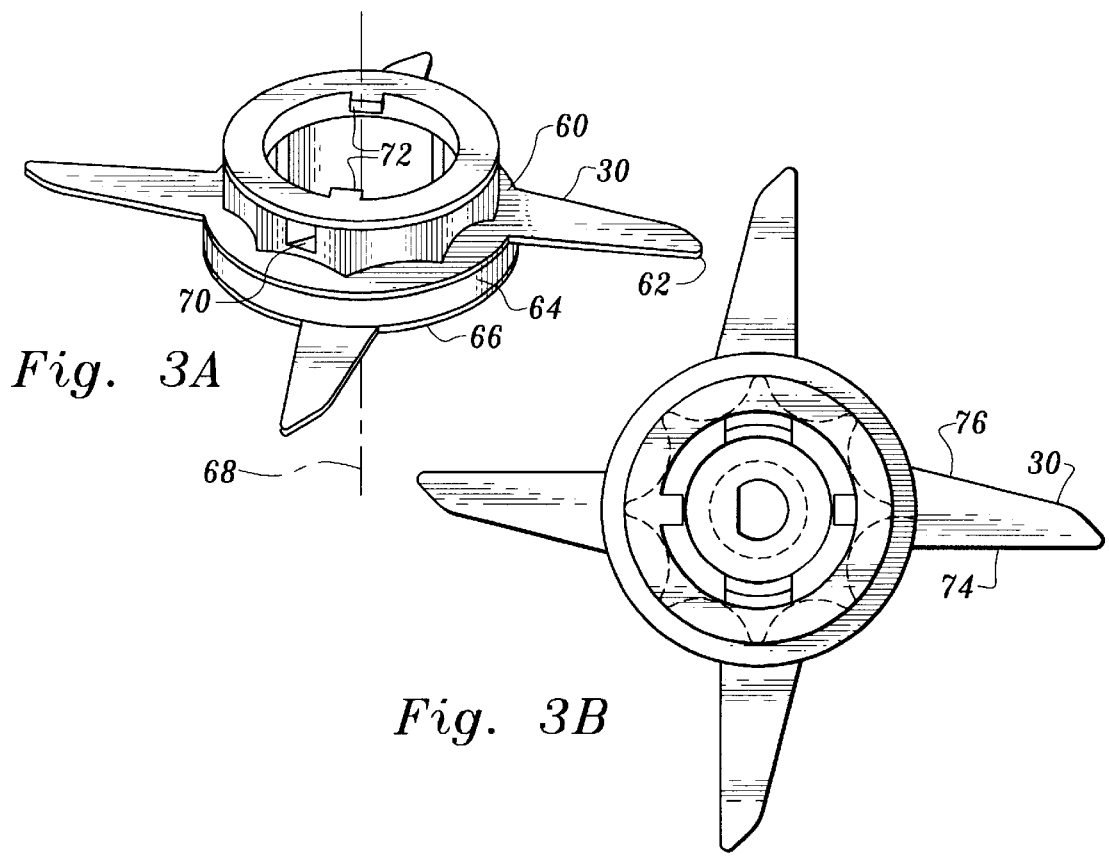
Fig. 3A
Fig. 3B

FOOD PROCESSING APPARATUS

BACKGROUND OF THE INVENTION

1. Field of the Invention

The present invention relates to food processing. More particularly, the present invention relates to an apparatus having an rotating blade which can be slidably positioned along the shaft, and wherein the shaft is hollow so that fluids and other materials may be added during processing.

2. The Background Art

In order to efficiently chop vegetables and other materials, food processors were developed. A typical food processing system comprises a motor-driven apparatus which has a shaft projecting outward from the motor along the axis of rotation. An enclosure is often provided, within which food to be processed may be placed.

Various devices for performing food processing functions may be coupled to the shaft. One common device is a blade assembly which has blades projecting outward from the axis of rotation. When the motor rotates the shaft, the blades rotate, causing the food provided within the enclosure to be chopped.

Although food processors are suitable for their intended purpose, smaller materials processed by prior art systems tend to get clumped together due to a lack of air flow within the processing apparatus.

A second drawback to prior art systems is that they fail to provide for adding additional materials to the system during the processing period.

OBJECTS AND ADVANTAGES OF THE INVENTION

It is an object and advantage of the present invention to provide a food processing apparatus which aerates materials being processed.

It is a second object and advantage of the present invention to provide a food processing system which allows an operator of the system to add additional materials to the processing mixture during the processing period.

It is yet a third object and advantage of the present invention to provide a food processing apparatus having a blade assembly which is adjustable in vertical position within the processing chamber.

SUMMARY OF THE INVENTION

A food processing system is described, comprising a processing chamber having a material intake and a shaft aperture, a motor assembly having a shaft, the shaft rotating along a vertical axis when the motor turns, the shaft passing through said shaft aperture into said processing chamber, an accessory coupler positioned within the processing chamber and coupled with the shaft, the accessory coupler having a first aperture and a second aperture, the first aperture being positioned so that material introduced into the processing chamber passes into the accessory coupler, and out through the second aperture, a blade assembly slidably connected to the accessory coupler so that the blade assembly may be vertically positioned in at least two distinct vertical locations along the axis of rotation of the shaft, the blade assembly further comprising an aperture through which material passes from the accessory coupler, through the blade assembly, into the processing chamber, as the shaft is rotated by said motor assembly.

BRIEF DESCRIPTION OF THE DRAWINGS

FIGS. 2A, 2B, 2C, and 2D depict the accessory coupler of FIG. 1 in more detail.

FIGS. 3A and 3B together comprise detailed drawings of the blade assembly of FIG. 1.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
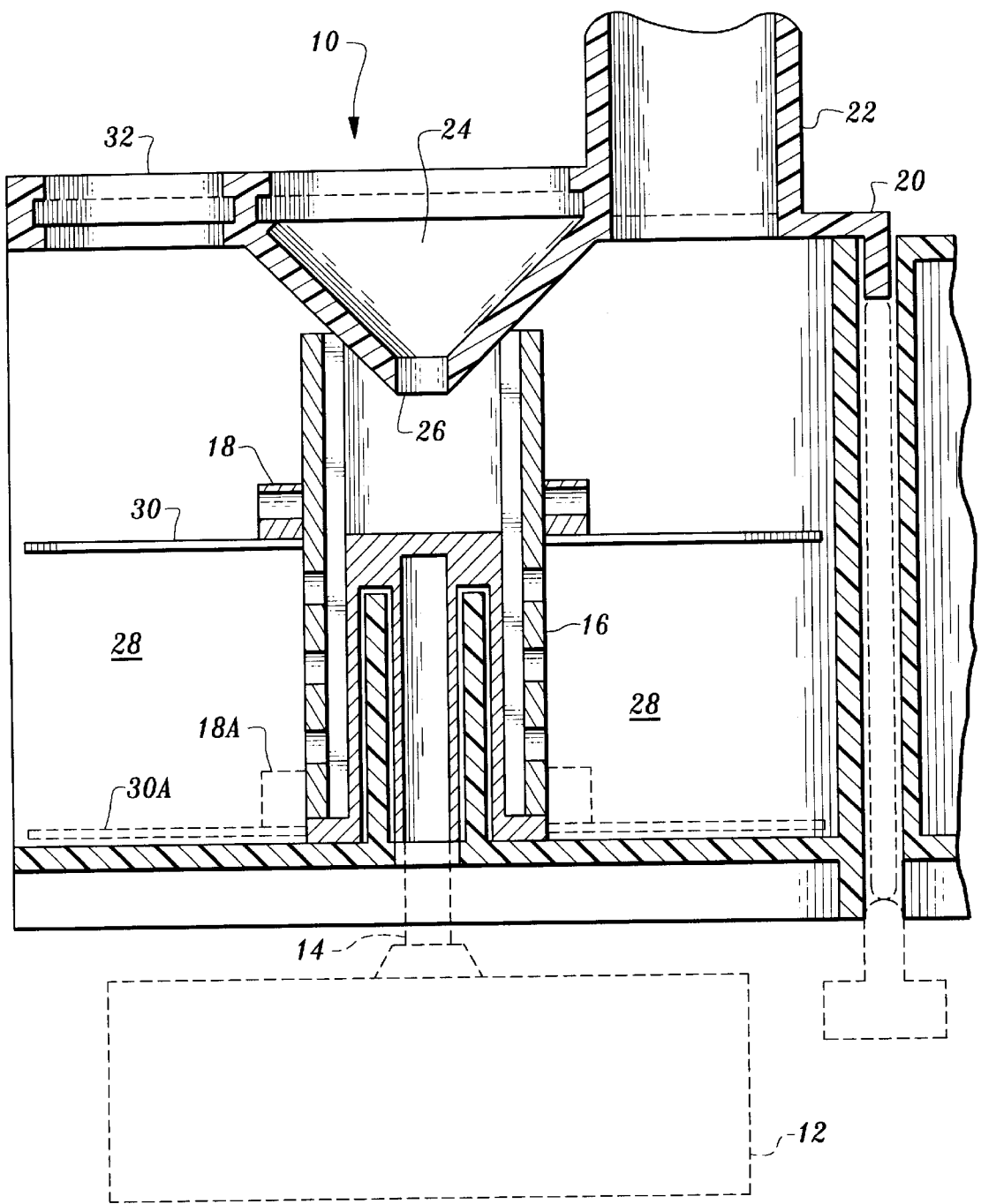
FIG. 1 is a side view of a food processing system according to a presently preferred embodiment of the present invention.

FIG. 1 is a side view of a food processing system according to a presently preferred embodiment of the present invention.

Referring to FIG. 1, food processing system 10 comprises a motor apparatus 12 having a rotatable shaft 14, an accessory coupler 16, blade assembly 18, and food enclosure 20. Although a single blade assembly 18 is presented, it is contemplated by the inventor that two or more blade assemblies such as blade assembly 18 and blade assembly 18A may be present in the apparatus, each of the multiple blade assemblies 18A and 18B being position at different vertical positions along the rotation axis of accessory coupler 16. Those of ordinary skill in the art having knowledge of the content of this disclosure will recognize that many such blade assemblies may be accomodated by the present invention., each of said blade assemblies 18 having one or more blades 30. More detail relating to the construction and features of blade 30 will be presented in later paragraphs.

Food enclosure 20, in addition to having prior art material intake 22, has a funnel 24, and particle intake 26. Funnel 24 and particle intake 26 together provide a location at which fluid, air, and/or particulate matter such as sugars may be introduced into accessory coupler 16. Material introduced into accessory coupler 16 is subsequently drawn into processing chamber 28. Once such material is introduced, the mixing action produced by rotating blades 30 will eventually cause the introduced material to become uniformly mixed in with other materials already present within processing chamber 28.

An additional feature of the present invention is adjustable exhaust port 32 which can be adjusted by a user of the system to provide a variable level of venting for air pressure which may build up during food processing.

FIGS. 2A, 2B, 2C, and 2D depict the accessory coupler of FIG. 1 in more detail.

Referring to FIG. 2A, accessory coupler 16 comprises a cylindrical apparatus having internal guide slots 40 for interfacing accessory coupler 16 to shaft 14, and external guide slots 42 for interfacing with blade assembly 18. Accessory coupler 16 further comprises apertures 44A, 44B, and 44C which are provided to pass materials from the hollow center of accessory coupler 16 to blade assembly 18.

Referring to FIG. 2B, a section is taken down the axis of the cylinder of the accessory coupler 16 in a plane which bisects external guide slots 42. Slot 46 interfaces with the shaft 14 of motor 12. Notches 48 are provided along the length of accessory coupler 18 within slots 42, each notch being used to secure a blade assembly 18 at a given vertical position along the accessory coupler 16.

Referring to FIG. 2C, a section is taken down the axis of accessory coupler 16, in a plane which bisects internal guide slots 40 and apertures 44. Shown in this view is spacing between outer cylinder 50 and inner cylinder 52 of accessory coupler 16. Liquids or solid materials such as sugar, grain, or other materials may be introduced into the top of accessory coupler 16. These materials pass between outer cylinder 50 and inner cylinder 52 then pass through blade assembly 18 into the interior of processing chamber 28 through apertures 44.

FIGS. 3A and 3B together comprise detailed drawings of the blade assembly of FIG. 1.

Referring to FIG. 3A, a preferred blade assembly apparatus 18 is shown, the preferred apparatus differing from that seem in FIG. 1 in that the assembly of FIG. 1 shows blades 30 in a single plane. The preferred arrangement of blades 30 is seen in FIG. 3A to be arranged in staggered parallel planes. An alternative embodiment contemplated by the inventor comprises multiple blade assemblies 18 having one or more blade in multiple configurations which will be described in later paragraphs.

Blade assembly 18 preferably comprises a top portion 60, a first blade 62, a middle portion 64, and a second blade 66. First blade 62 and second blade 66 are typically identical, and are manufactured so that when blade assembly 18 is rotated about axis 68, blades 62 and 66 chop the material within processing chamber 28. Also shown in FIG. 3A is bore 70 which will be described in more detail in our discussion of FIGS. 4A. A second bore on the opposite side of blade assembly 18 is not shown. Finally, extrusions 72 are shown which, when blade assembly 18 is properly positioned along accessory coupler 16, fit within notches 48, securing blade assembly 18 from moving vertically while motor 14 is rotating shaft 14.

Top portion 60 and middle portion 64 preferably comprise injection molded plastic so that they may be manufactured easily in quantity, but may be made of any suitable material, while remaining within the scope and purpose of the present invention.

FIG. 3B presents a top view of blade assembly 18, showing each blade 30 having a sharpened edge 70 and a trailing edge 72. Sharpened edge 70 is typically positioned so that a counterclockwise rotation of shaft 14 by motor 12 will chop materials within processing chamber 28. However, those of ordinary skill in the art will readily recognize that a food processing system comprising the present invention can easily be designed so that blades 30 rotate clockwise, and therefore have cutting edge 70 and trailing edge 72 reversed from the design shown in FIG. 3B.

Figure 4A:
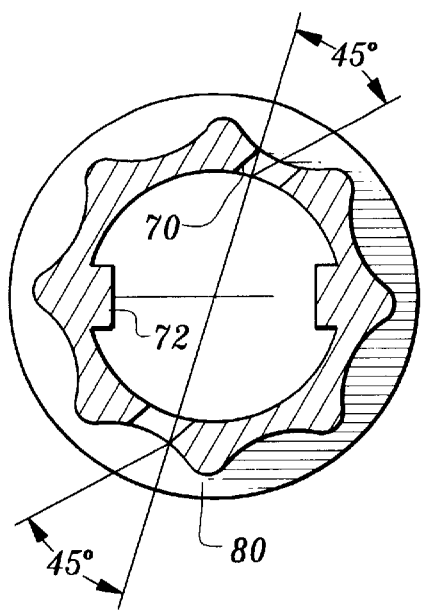
FIGS. 4A, 4B, and 4C detail features of the top portion of the blade assembly of FIG. 3.
Figure 4B:
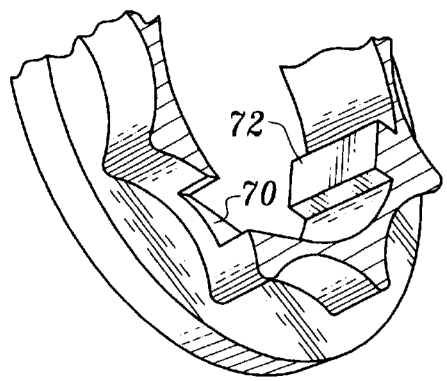
Figure 4C:
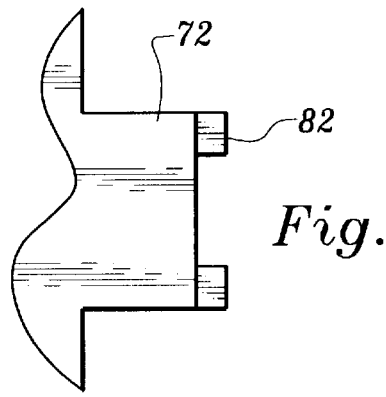

FIGS. 4A, 4B, and 4C detail features of the top portion of the blade assembly of FIG. 3.

Referring to FIG. 4A, a top view of top portion 60 of blade assembly 18 is presented showing bores 70 and extrusions 72. Bores 70 are provided so that material from within accessory coupler 16 may pass into the processing chamber 28 as the blade assembly is rotated. The angle of bores 70 with respect to a radius line drawn from the center of top portion 60 as seen in FIG. 4A to through the center of each bore as seen at reference designation 74 is preferably 45 degrees. However, it is contemplated by the inventors that other angles such as between 10 degrees and 45 degrees are acceptable, so long as the angle provides for a suction to be produced. By angling the exit point of bores 70 away from the direction of rotation on shaft 14, a suction is produced which will draw air, liquids, and other introduced materials through accessory coupler 16 into processing chamber 28.

The angles shown for bores 70 in FIG. 4A are drawn after assuming a rotation which is counterclockwise. In a system having a clockwise rotation, bores 70 will be drawn so that the angles are reversed so that the exterior exit of the bore trails in rotation with respect to the interior exit of the bore.

FIG. 4B provides a different perspective on bore 70 and extrusions 72.

FIG. 4C shows more detail of the construction of extrusions 72. Referring to FIG. 4C, extrusions 72 have tips 76 which are constructed of a material which is flexible compressible enough to allow the blade assembly 18 to be moved vertically along accessory coupler 16, but also durable enough to secure blade assembly 18 when extrusions 72 are positioned within notches 48.

Figures 5A, 5B:
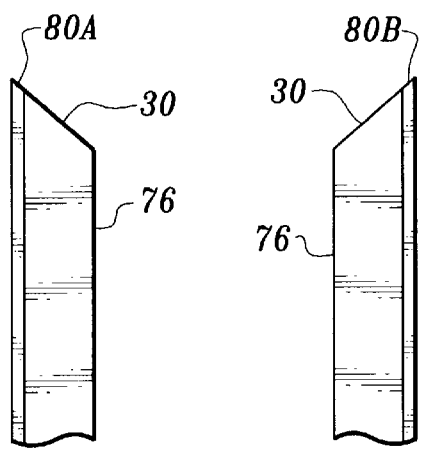
FIGS. 5A, 5B, and 5C detail features of a food processing blade according to a presently preferred embodiment of the present invention.
Figure 5C:

FIGS. 5A, 5B, and 5C detail features of a food processing blade according to a presently preferred embodiment of the present invention. FIGS. 5A, 5B, and 5C are collectively referred to herein as FIG. 5 for convenience.

Figure 6:
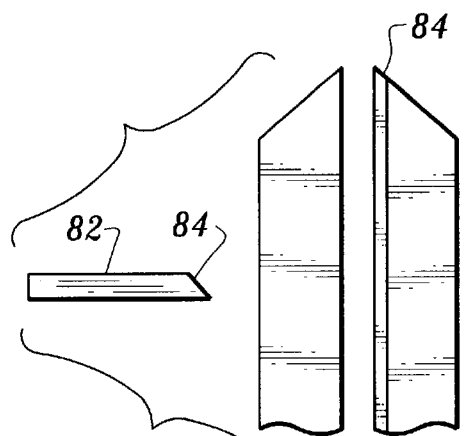
FIG. 6 shows a prior art blade having a single-bevel cutting edge.

Referring to FIG. 5, it has been previously stated that blade 30 comprises a sharpened end 78 and a trailing edge 76. Regardless of other features of the presently preferred embodiment of the present invention as described herein, it has been discovered by the inventor that a dual-beveled cutting edge 80 (seen as edges 80A and 80B in FIGS 5A and 5B respectively) chops material present within processing chamber 28 significantly more efficiently than the typical prior art blade seen in FIG. 6. Prior art blade 82 comprises a single-bevel cutting edge 84. Blades for processing food according to a presently preferred embodiment of the present invention are preferably less than 0.024" thick in order to achieve the maximum efficiency of the food processing apparatus.

Although the blade 30 shown in FIG. 5 and preceding figures is straight, it is contemplated that other prior art blade designs would benefit from having dual-beveled designs. One such blade is the s-blade which has a single-bevel according to the prior art.

An alternate embodiment blade contemplated by the inventor which is used for crushing ice is preferably stainless steel, not sharpened on either edge, and is between 0.024" thick and 0.045" thick but preferably 0.035" thick.

Figure 7A:
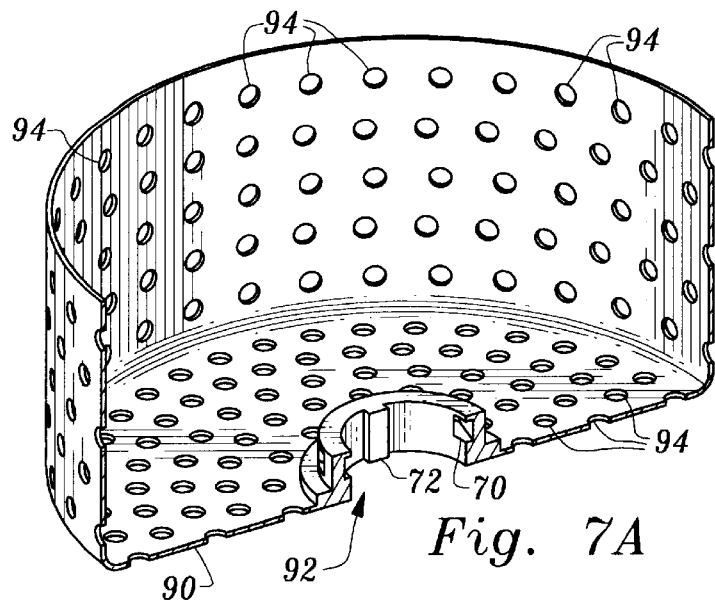
FIGS. 7A and 7B shows a cutaway view and a side view respectively of a collandar according to a presently preferred embodiment of the present invention.
Figure 7B:
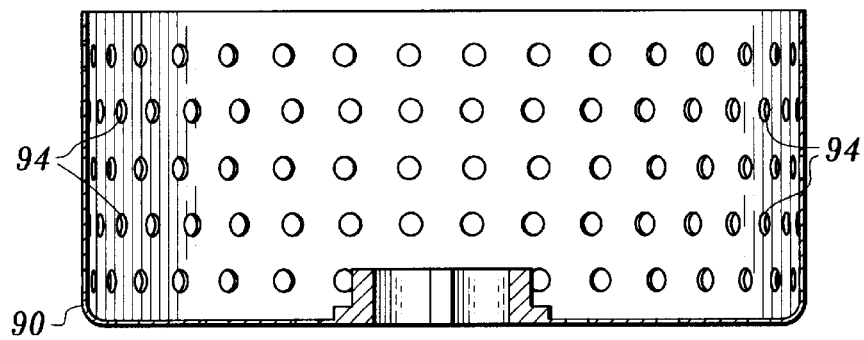
Figure 7C:
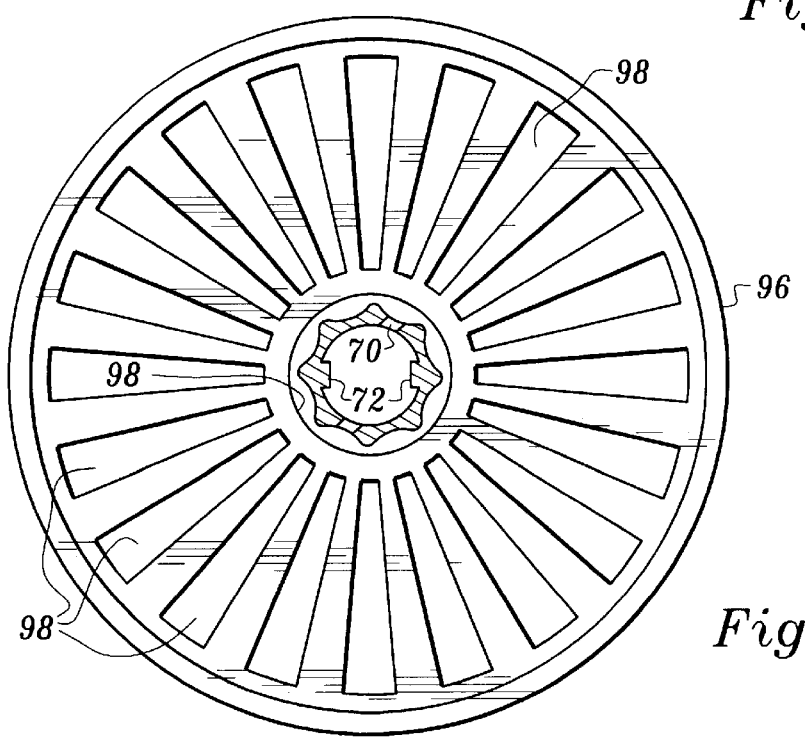
FIG. 7C shows a lid which may be be used with the collandar assembly of FIGS. 7A and 7B.

FIGS. 7A and 7B shows a cutaway view and a side view respectively of a collandar according to a presently preferred embodiment of the present invention. FIG. 7C shows a lid which may be used with the collandar assembly of FIGS. 7A and 7B.

Referring to FIG. 7, collandar 90 is a cylindrical apparatus which fits inside processing chamber 20, and is used to spin dry material placed within collandar 90. Collandar 90 comprises a center portion 92 which interfaces with accessory coupler 16 in the same way a blade assembly 18 interfaces with accessory coupler 16 so that when shaft 14 rotates, collandar 90 rotates within processing chamber 20.

Collandar 90 further comprises holes 94 which are provided to ensure adequate air flow through the collandar 90 and any material contained therein. It is anticipated that as the collandar rotates on its axis due to the rotation of shaft 14, water, if present within collandar 90 may pass through holes 94, so that drying may occur.

Lid 96 for collandar 90 has a center portion 98 which interfaces with accessory coupler 16 in the same way a blade assembly 18 and collandar 90 interface with accessory coupler 16 so that when shaft 14 rotates, lid 96 rotates within processing chamber 20. Further, lid 96 is preferred to have a outer diameter which is slightly smaller than the inside diameter of collandar 90 so that lid 96 may be positioned to compress material within collandar 90 if desired during processing.

Lid 96 may also be used within processing chamber 20 without collandar 90 if a user desires a special stirring action which may be provided to materials within processing chamber 20 by slots 98 cut into lid 96 during manufacture. Lid 96, if used as a mixing wheel, may also have louvers in place of slots 98, the louvers providing more efficient mixing action than spokes.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A food processing apparatus comprising:
   a processing chamber having a material intake and a shaft aperture;
   a motor assembly having a shaft, said shaft rotating along a vertical axis when the motor turns, said shaft passing through said shaft aperture into said processing chamber;
   an accessory coupler positioned within said processing chamber and coupled with said shaft, said accessory coupler comprising a cylindrical solid having a bore driven partially therethrough and at least one aperture, said bore being positioned so that material introduced into said processing chamber passes through said material intake into said accessory coupler, and out through said at least one aperture;
   a blade assembly having a blade, said blade assembly positioned within said processing chamber and slidably connected to said accessory coupler so that said blade assembly may be vertically positioned in at least two distinct vertical locations along the axis of rotation of said shaft, said blade assembly further comprising a bore through which material passes from said accessory coupler, through said blade assembly, into said processing chamber, as said shaft is rotated by said motor assembly.

2. The food processing apparatus of claim 1 wherein said blade assembly having a blade comprising a dual-beveled cutting edge.

3. The food processing apparatus of claim 2 wherein the cutting surface of said blade is straight.

4. The food processing apparatus of claim 2 wherein the cutting surface of said blade is curved.

5. The food processing apparatus of claim 2 wherein said blade is no greater than 0.024 thick.

6. The food processing system of claim 1 wherein said blade assembly bore passes through said blade assembly at an angle of not less than 10 degrees and not greater than 60 degrees with respect to a radius drawn from the axis of rotation of said accessory coupler through the center of the bore, the interior end of said bore preceding the exterior end of said bore in rotation.

7. The food processing system of claim 6 wherein said blade assembly bore angle is 45 degrees.

8. The food processing system of claim 1 wherein said blade assembly is further defined as comprising:
   a first blade and a second blade, each of said first and second blades being mounted in distinct parallel planes with respect to each other, each rotating about an axis which passes through the center of each blade.

9. The food processing system of claim 1 wherein said material intake comprises a funnel assembly, said funnel assembly comprising a narrow end and a wide end, said funnel being positioned so that material entering the wide end of the funnel passes through the narrow end of the funnel into said accessory coupler.

10. The food processing system of claim 8 wherein said narrow end of the funnel comprises an aperture whose diameter is specifically designed to pass particular material at a desired rate.

11. The food processing apparatus of claim 1 wherein said blade assembly comprises an ice crushing blade having a blunt cutting edge.

12. The food processing apparatus of claim 11 wherein said ice crushing blade is between 0.024 inches thick and 0.045 inches thick.

13. The food processing apparatus of claim 12 wherein said ice crushing blade is 0.035 inches thick.

* * * * *

UNITED STATES PATENT AND TRADEMARK OFFICE
CERTIFICATE OF CORRECTION

PATENT NO. : 6,007,011
DATED : December 28, 1999
INVENTOR(S) : Theodore McBain

It is certified that error appears in the above-identified patent and that said Letters Patent is hereby corrected as shown below:

On Page 5, Line 16, Please delete "blade assemblies 18A and 18B" and replace with --blade assemblies 18 and 18A--.

On Page 5, Line 19, please delete "invention.," and replace with --invention,--.

On Page 6, Line 14, please delete "FIGS. 2A, 2B, 2C, and 2D" and replace with --FIGS. 2A, 2B, and 2C--.

On Page 4, Line 1, please delete "FIGS. 2A, 2B, 2C, and 2D" and replace with --FIGS. 2A, 2B, and 2C--.

On Page 9, Line 5, please delete "sharpened edge 70 and a trailing edge 72. Sharpened edge 70" and replace with --sharpened edge 73 and a trailing edge 74. Sharpened edge 73--.

On Page 9, Line 10, please delete "cutting edge 70 and trailing edge 72" and replace with --sharpened edge 73 and trailing edge 74--.

UNITED STATES PATENT AND TRADEMARK OFFICE
CERTIFICATE OF CORRECTION

PATENT : 6,007,011
DATED : December 28, 1999
INVENTOR(S): Theodore McBain

It is certified that error appears in the above-identified patent and that said Letters Patent is hereby corrected as shown below:

On Page 11, Line 6, please delete "sharpened end 78 and a trailing edge 72" and replace with --sharpened end 73 and trailing edge 74--.

On Page 12, Line 10, please delete "FIG. 7" and replace with --FIG. 7A--

Signed and Sealed this

Fifteenth Day of May, 2001

Attest:

NICHOLAS P. GODICI

*Attesting Officer*     *Acting Director of the United States Patent and Trademark Office*